United States Patent [19]
Oh et al.

[11] Patent Number: 5,850,134
[45] Date of Patent: Dec. 15, 1998

[54] BATTERY-POWERED EQUIPMENT AUTOMATICALLY DETECTING BATTERY TYPES

[75] Inventors: Jae-Choeul Oh; Yeon-Chul Choo, both of Suwon, Rep. of Korea

[73] Assignee: SamSung Electronics Co., Ltd., Suwon, Rep. of Korea

[21] Appl. No.: 3,496

[22] Filed: Jan. 6, 1998

[30]    Foreign Application Priority Data

Jan. 6, 1997 [KR] Rep. of Korea ..................... 1997 94

[51] Int. Cl.⁶ .................................................. H01M 10/46
[52] U.S. Cl. ........................................................ 320/106
[58] Field of Search .................................. 320/106, 107, 320/110, 112, 125, 128, 132, 134, 136, 144, 150, 153, DIG. 12, DIG. 21, 101, 105, 114, 129, 138

[56]    References Cited

U.S. PATENT DOCUMENTS

| | | |
|---|---|---|
| 5,164,652 | 11/1992 | Johnson . |
| 5,184,059 | 2/1993 | Patino . |
| 5,237,257 | 8/1993 | Johnson . |
| 5,273,319 | 12/1993 | Keener . |
| 5,300,874 | 4/1994 | Shimamoto . |
| 5,332,957 | 7/1994 | Lee . |
| 5,350,993 | 9/1994 | Yoya . |
| 5,489,834 | 2/1996 | Pitkanen . |
| 5,510,690 | 4/1996 | Tanaka . |
| 5,534,765 | 7/1996 | Kreisinger . |
| 5,554,921 | 9/1996 | Li . |
| 5,572,110 | 11/1996 | Dunstan . |
| 5,576,610 | 11/1996 | Patino . |
| 5,587,924 | 12/1996 | Rossi . |
| 5,592,069 | 1/1997 | Dias . |
| 5,602,455 | 2/1997 | Stephens . |
| 5,608,306 | 3/1997 | Rybeck . |
| 5,627,449 | 5/1997 | Fujiki . |
| 5,646,501 | 7/1997 | Fishman . |
| 5,656,917 | 8/1997 | Theobald . |

*Primary Examiner*—Edward Tso
*Attorney, Agent, or Firm*—Robert E. Bushnell, Esq.

[57] ABSTRACT

Battery-powered equipment for detecting the type of battery installed therein, includes a plurality of types of batteries which can be installed in the battery-powered equipment. Each of the batteries has a positive power terminal, a negative power terminal, and first to third detection terminals. The battery-powered equipment includes a battery type detector for detecting the type of an installed battery according to terminal voltages on the first to third detection terminals of the installed battery. The equipment further includes a battery charger for controlling the charging and discharging of the installed battery on the basis of the detected battery type.

4 Claims, 11 Drawing Sheets

BATTERY-POWERED EQUIPMENT AUTOMATICALLY DETECTING BATTERY TYPES

CLAIM OF PRIORITY

This application makes reference to, incorporates the same herein, and claims all benefits accruing under 35 U.S.C. §119 from an application for BATTERY-POWERED EQUIPMENT AUTOMATICALLY DETECTING BATTERY TYPES earlier filed in the Korean Industrial Property Office on the 6$^{th}$ of Jan. 1997 and there duly assigned Ser. No. 94/1997.

BACKGROUND OF THE INVENTION

1. Field of the Invention

The present invention generally relates to portable electronic equipment provided with rechargeable batteries and, more particularly, to battery-powered equipment for detecting the type of a battery which is installed therein and controlling the charging and discharging of the installed battery on the basis of the detected battery type.

2. Related Art

Rechargeable batteries are commonly used to supply power to many of today's portable electronic equipment such as computers, cellular phones, personal digital assistants (PDAs), video cameras, etc. Typically, such electronic equipment are capable of utilizing AC (alternating current) power when it is possible to have access to conventional AC power outlets. Battery power is utilizing when conventional outlets are not available or are not convenient.

In general, batteries of different types, characterized by chemical components, such as Alkaline, Lithium (Li) Ion, nickel cadmium (Ni—Cd), nickel metal hydride (Ni—MH), etc., exhibit different charge/discharge characteristics. Further, such batteries may be classified into smart batteries with self-battery control function and dumb batteries without self-battery control function.

U.S. Pat. No. 5,572,110 to Dunstan, entitled Smart Battery Charger System, describes a smart battery which has a built-in microcontroller for performing self-battery control function. A smart battery charger responds to charging instructions supplied by such a smart battery. The smart battery also stores battery-specific charging characteristics. The smart battery determines a desired charging voltage and desired charging current based on measured environment conditions, such as battery temperature, and the charging characteristics. The smart battery includes clock and data terminals which provide a communication interface to the data and clock lines of a system bus, respectively, as well as positive and negative power terminals. But, it should be noted that a conventional battery (often called "dumb battery") is not provided with the clock and data terminals. That is, a dumb battery's terminal configuration is generally different from that of a smart battery. While such different terminal configurations, it is nearly impossible for both of them to be commonly used for the same electronic equipment. There have been requirements that different types of batteries can be interchangeably used to provide power for the same equipment (e.g., for a portable computer). In this case, it is necessary for the battery-powered equipment to automatically recognize the type of a battery which is installed in the equipment. This knowledge of the battery type may be useful to the equipment in establishing charging parameters such as the charging rate of the battery or in warning a user of a low battery condition.

U.S. Pat. No. 5,332,957 to Lee, entitled Battery Module And Charger, discloses dumb battery arrangements while the patent to Kerisinger et al., U.S. Pat. No. 5,534,765, entitled Battery With Memory For Storing Charge Procedure, illustrates battery arrangements which may be classified as smart batteries.

The patent to Toya et al., U.S. Pat. No. 5,350,993 entitled Power Supply, discloses a battery pack arrangement utilizing arithmetic circuits to identify the battery type.

The following additional patents each disclose features in common with the present invention but are not as pertinent as the references discussed in detail above: U.S. Pat. No. 5,576,610 to Patino et al, entitled Method And Apparatus For Determining Battery Characteristics, U.S. Pat. No. 5,592,069 to Dias et al., entitled Battery Charger, U.S. Pat. No. 5,602,455 to Stephens et al., entitled Portable Battery Charger With Integrally Attached Output Cable, U.S. Pat. No. 5,608,306 to Rybeck et al., entitled Rechargeable Battery Pack With Identification Circuit Real Time Clock And Authentication Capability, U.S. Pat. No. 5,656,917 to Theobald, entitled Battery Identification Apparatus And Associated Method, U.S. Pat. No. 5,646,501 to Fishman et al, entitled Flexible Power Architecture Which Supports Multiple Battery Technologies For Use With A Portable Device, U.S. Pat. No. 5,164,652 to Johnson et al., entitled Method And Apparatus For Determining Battery Type And Modifying Operating Characteristics, U.S. Pat. No. 5,274,319 to Keener et al., entitled Rechargeable Battery Manager, U.S. Pat. No. 5,489,834 to Pitkanen, entitled Battery Type And Temperature Identification Circuit, U.S. Pat. No. 5,300,874 to Shimamoto et al., entitled Intelligent Power Supply System For A Portable Computer, U.S. Pat. No. 5,184,059 to Patino et al., entitled Expanded Battery Capacity Identification Scheme And Apparatus, U.S. Pat. No. 5,237,257 to Johnson et al., entitled Method And Apparatus For Determining Battery Type And Modifying Operating Characteristics, U.S. Pat. No. 5,554,921 to Li et al., entitled Battery Charger Apparatus And Method With Multiple Range Current Control, U.S. Pat. No. 5,587,924 to Rossi, entitled Automatic System For Handling Batteries, U.S. Pat. No. 5,510,690 to Tanaka et al., entitled Battery Pack, Battery Discrimination Control Apparatus And Method Therefor, and U.S. Pat. No. 5,627,449 to Fujiki, entitled Electronic Device, Battery Pack And Charger For The Battery Pack.

SUMMARY OF THE INVENTION

It is therefore an object of the present invention to provide battery-powered equipment which detects the type of a battery which is installed therein and controls the charging and discharging of the installed battery on the basis of the detected battery type.

In order to attain the above object, according to an aspect of the present invention, there is provided a plurality of batteries which can be installed in battery-powered equipment. Each of the batteries has a positive power terminal, a negative power terminal, and first to third detection terminals. The battery-powered equipment includes a battery type detector for detecting the type of an installed battery according to terminal voltages on the first to third detection terminals of the installed battery. The equipment further includes a battery charger for controlling the charging and discharging of the installed battery on the basis of the detected battery type. In preferred embodiments, the battery type detector includes a microcontroller for detecting the type of installed battery by means of the first to third terminal voltages.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

A plurality of batteries each having detection terminals, and battery-powered equipment including a battery type detector for detecting the type of an installed battery according to voltages on the detection terminals of the installed battery, is described below. In the following description, numerous specific details such as circuit configuration, voltage, temperatures, and battery characteristics are set forth in order to provide a thorough understanding of the present invention. It will be apparent, however, to one skilled in the art that the present invention may be practiced without these specific details. In other instances, well-known methods and circuits are shown in block diagram form in order not to obscure the present invention.

Figure 1:
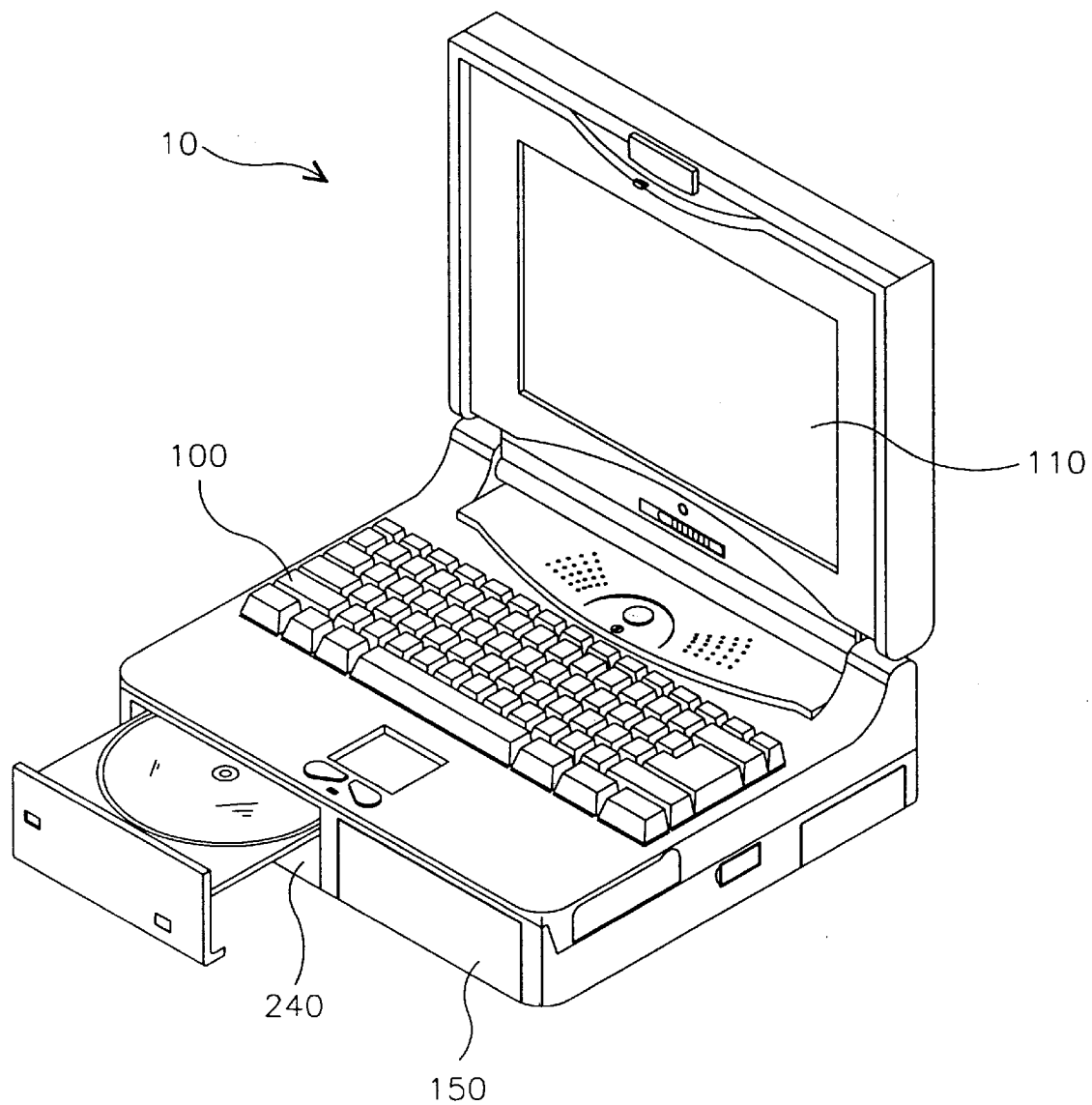
FIG. 1 is a schematic diagram showing an exemplary battery-powered equipment.
Figure 2:
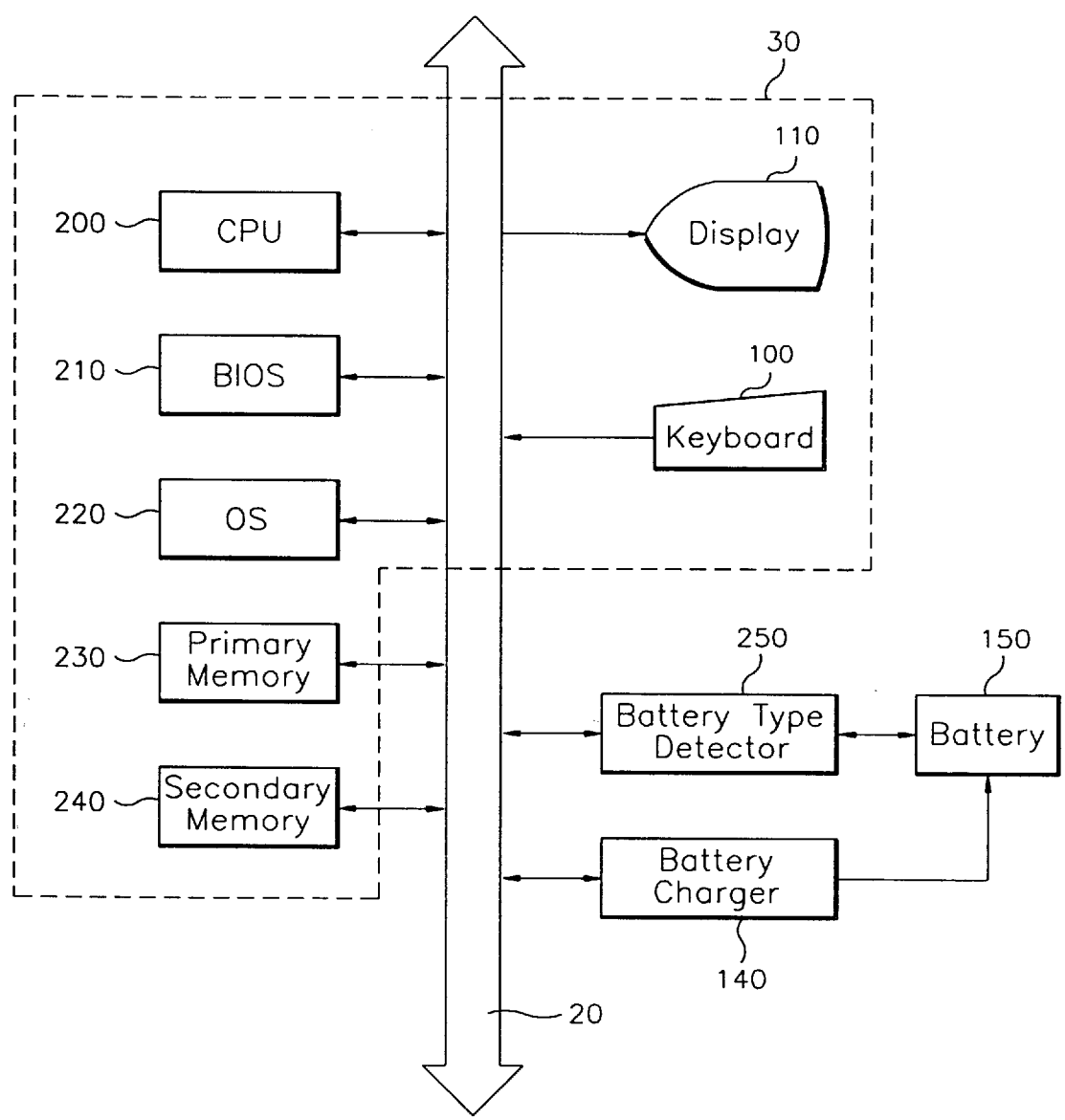
FIG. 2 is a block diagram showing the construction of battery-powered equipment according to the present invention.

As exemplary one of battery-powered equipment, a portable computer system is shown in FIG. 1. Referring first to FIG. 1, the computer system 10 can be operated with a battery 150. FIG. 2 shows the circuit construction of the exemplary battery-powered equipment (i.e., portable computer) in accordance with the present invention. Referring next to FIG. 2, the computer system 10 includes a system bus 20, a system host 30, a rechargeable battery 150, a battery charger 140, and a battery type detector 250. Further, the system host 30 includes several devices and firmware, such as a keyboard 100, a display 110, a central processing unit (CPU) 200, a basic input/output system BIOS unit 210, an operating system OS unit 220, a primary memory 230, one or more secondary memories 240, etc.

Figure 3A:
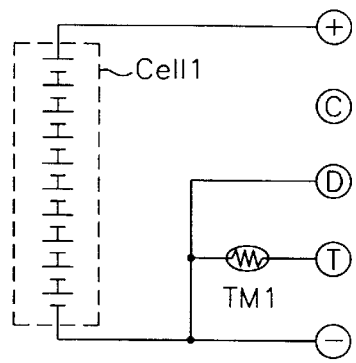
FIGS. 3A and 3B are schematic diagrams showing terminal configurations of Ni—MH dumb and smart batteries, respectively.
Figure 3B:
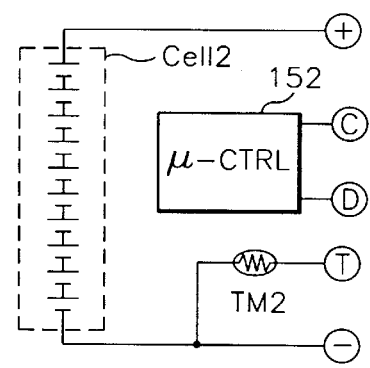
Figure 4A:
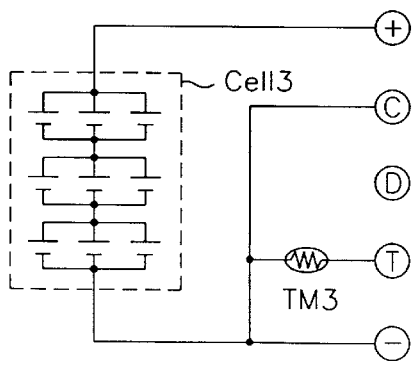
FIGS. 4A and 4B are schematic diagrams showing terminal configurations of Li—Ion dumb and smart batteries, respectively.
Figure 4B:
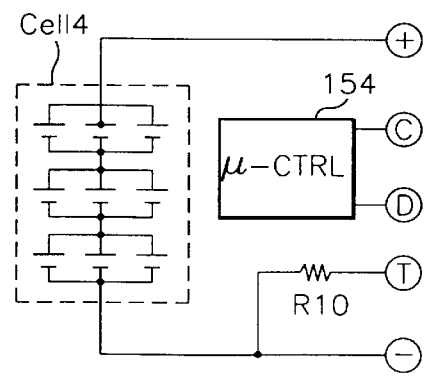

In order that different types of batteries can be interchangeably used to provide power for the same equipment (i.e., portable computer system), each of the batteries which can be installed in the computer system has a positive power terminal '+', a negative power terminal '−', and first to third detection terminals 'C', 'D' and 'T' (as shown in FIGS. 3A, 3B, 4A and 4B). The first and second detection terminals C and D correspond to clock and data communication terminals of a smart battery with self-battery control function, respectively. The third detection terminal T corresponds to a temperature detection terminal of a dumb battery. For this disclosure, a smart battery means a battery having a self-battery control function, and a dumb battery means a battery not having a self-battery control function. FIGS. 3A and 3B show terminal configurations of nickel metal hydride (Ni—MH) dumb and smart batteries, respectively, and FIGS. 4A and 4B show those of Li—Ion dumb and smart batteries, respectively.

Referring to FIG. 3A, the positive and negative terminals of the Ni—MH dumb battery are connected to positive and negative ends of Ni—MH battery cells 'Cell1' coupled in series, respectively. The first detection terminal (i.e., clock terminal) 'C' of the battery is open-circuited. The second detection terminal (i.e., data terminal) 'D' of the battery is commonly connected to the negative end of the cells along with the negative terminal '−' thereof. The third detection terminal (i.e., temperature detection terminal) 'T' ofthe battery is connected to the negative terminal '−' thereof (or, the negative end of the cells) via a temperature sensor TM1, such as a thermistor, a thermocouple, a semiconductor temperature sensor, or other temperature sensing device, that produces an analog signal proportional to the sensed temperature.

Referring to FIG. 3B, the positive and negative terminals of the Ni—MH smart battery are connected to positive and negative ends of Ni—MH battery cells 'Cell2' also coupled in series, respectively, like those of the Ni—MH dumb battery. The smart battery includes a microcontroller 152. The controller 152 is physically embedded in the battery so as to perform self-battery control. The first detection terminal 'C' of the smart battery is connected to the clock line of the microcontroller 152. The second detection terminal 'D' of the battery is connected to the data line of the controller 152. The third detection terminal 'T' of the battery is connected to the negative terminal '−' thereof (or, the negative end of the cells) via a temperature sensor TM2, like the Ni—MH dumb battery.

Referring to FIG. 4A, the positive and negative terminals of the Li—Ion dumb battery are connected to positive and negative ends of Li—Ion battery cells 'Cell3' coupled in series/parallel combination, respectively. The first detection terminal 'C' of the battery is commonly connected to the negative end of the cells along with the negative terminal '−' thereof. The second detection terminal 'D' of the battery is open-circuited. The third detection terminal 'T' of the battery is connected to the negative terminal '−' thereof (or, the negative end of the cells) via a temperature sensor TM3.

Figure 5:
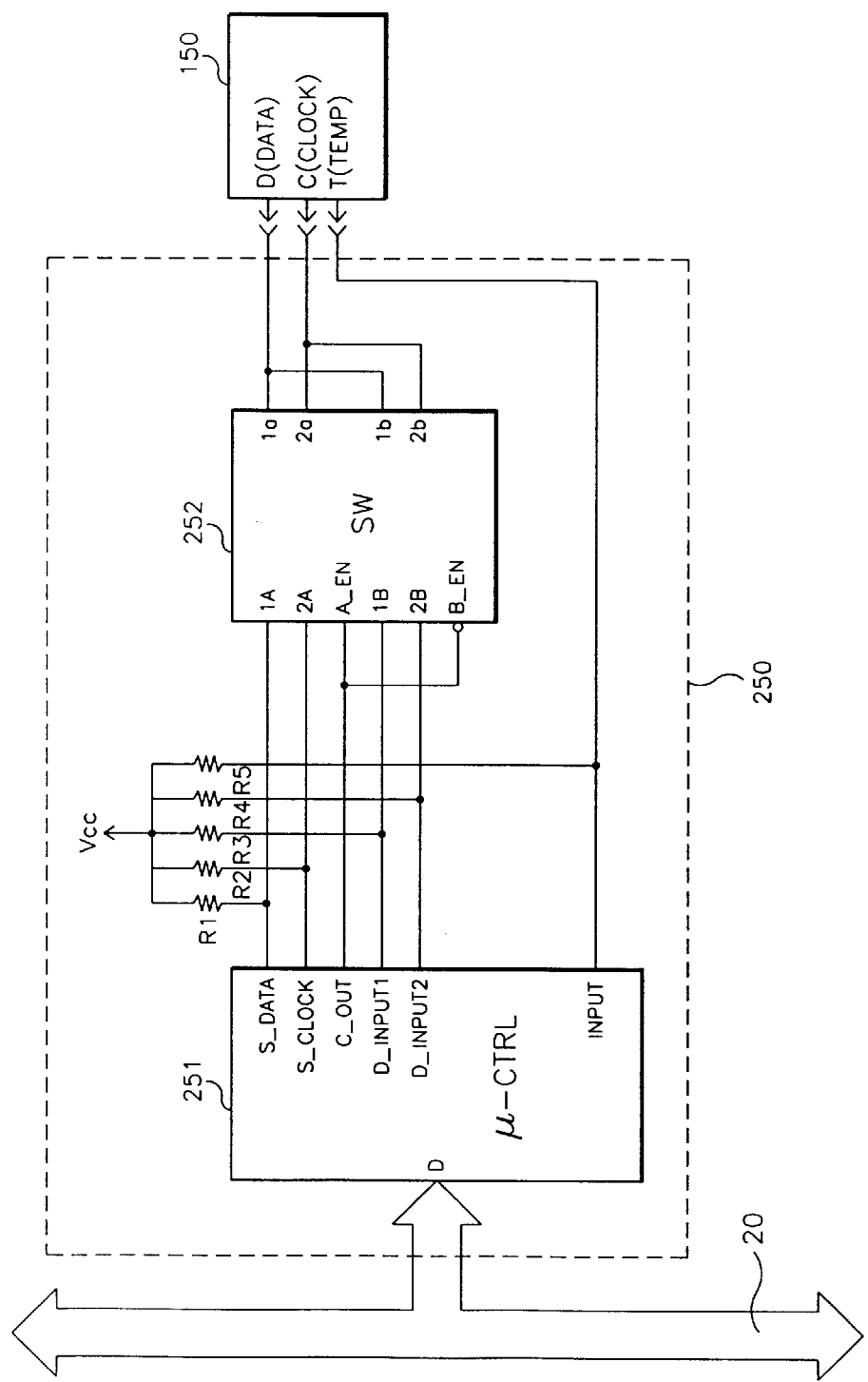
FIG. 5 is a circuit diagram of a battery type detector according to an embodiment of the present invention.

Referring to FIG. 4B, the positive and negative terminals of the Li—Ion smart battery are connected to positive and negative ends of Li—Ion battery cells 'Cell4' coupled in series/parallel combination, respectively, like those of the Li—Ion dumb battery. The smart battery also include a built-in microcontroller 154 for performing self-battery control. The first detection terminal 'C' of the smart battery is connected to the clock line of the microcontroller 154. The second detection terminal 'D' of the battery is connected to the data line of the controller 154. The third detection terminal 'T' of the battery is connected to the negative terminal '−' thereof (or, the negative end of the cells) via a resistor R10. FIG. 5 is a circuit diagram of a battery type detector suitable for battery-powered equipment in accordance with an embodiment of the present invention.

Referring to FIG. 5, the battery type detector 250 is placed between the system bus 20 and the rechargeable battery 150. The system bus 20 may be an I²C (Inter-Integrated Circuits serial interface) bus, or other buses. The battery 150 can be installed in the equipment and may be one of the above-described type of batteries. The battery type detector 250 includes a microcontroller 251 connected to the system bus 20. The controller 251 detects the type of the installed battery using terminal voltages on the first to third terminals of the installed battery. The controller 252 has four digital data input ports S_DATA, S_CLOCK, D_INPUT1 and D_INPUT2, a digital output port C_OUT, and an analog input port INPUT. The input port INPUT is directly connected to the detection terminal T of the battery 150. Although not shown in the figure, the microcontroller 251 has an analog-to-digital converter, therein, for converting analog temperature information of the battery 150 into digital information. The ports of the microcontroller 251 are connected to pull-up resistors R1 to R5, respectively.

The battery type detector 250 further includes an analog switch module 252 connected between the microcontroller 251 and the detection terminals C and D of the installed battery 150. The analog switch module 252 is controlled by the microcontroller 251. The switch module 252 has four input terminals 1a, 2a, 1b and 2b, four output terminals 1A, 2A, 1B and 2B, and two control terminals A_EN and B_EN. The input terminals 1a and 2a of the switch module 252 are connected to the detection terminals D and C of the battery 150, respectively. The output terminals 1A, 2A, 1B and 2B of the switch module 252 are connected to the corresponding ports S_DATA, S_CLOCK, D_INPUT1 and D_INPUT2 of the microcontroller 251, respectively. The control terminals A_EN and B_EN of the switch module 252 are commonly connected to the corresponding port C_OUT of the controller 251.

Figure 6:
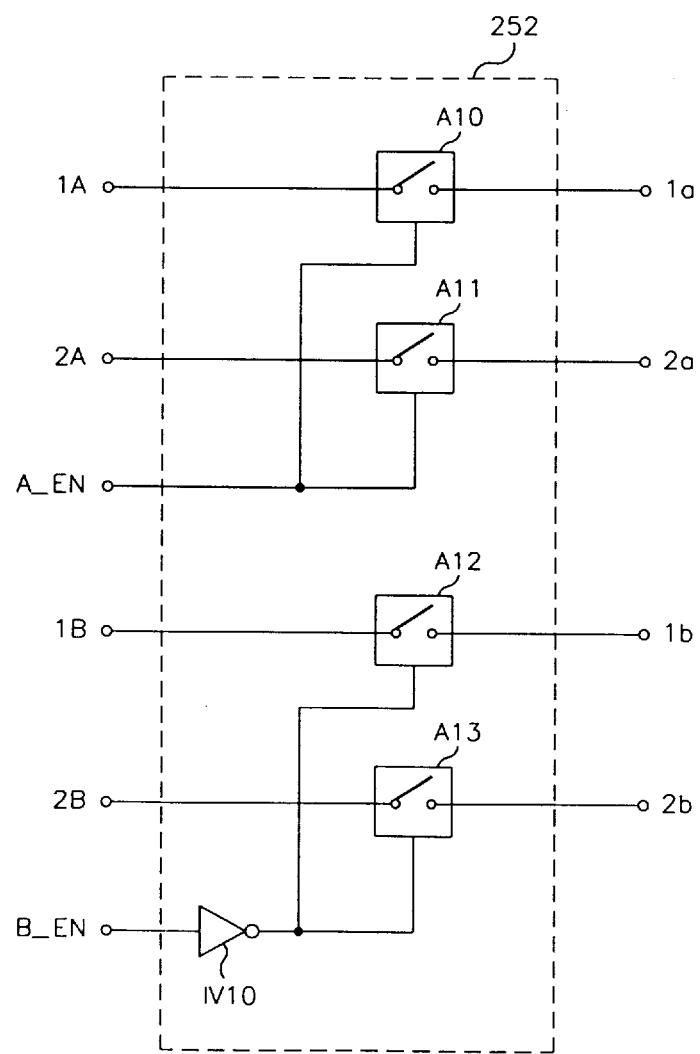
FIG. 6 is a detailed circuit diagram of the analog switch module of FIG. 5.

FIG. 6 is a circuit construction of the switch module of FIG. 5. Referring to FIG. 6, the switch module 252 includes four switch elements A10, A11, A12 and A13, and an inverter IV10. The switch elements A10 and A11 are closed and the switch elements A12 and A13 are open when the signal C_OUT from the microcontroller 251 goes to a high level (e.g., 5 volts). On the contrary, the switch elements A10 and A11 are open and the switch elements A12 and A13 are closed when the signal C_OUT from the microcontroller 251 goes to a low level (e.g. 0 volts).

Referring back to FIG. 5, the microcontroller 251 recognizes the installed battery 150 as a smart battery when the terminal voltages on the first and second detection terminals C, D and T of the battery 150 all are at predetermined voltage levels. On the other hand, the microcontroller 251 recognizes the installed battery 150 as a dumb battery without the self-battery control function when at least one of the terminal voltages on the first and second detection terminals C and D of the battery 150 is not at the predetermined voltage levels.

Figure 7:
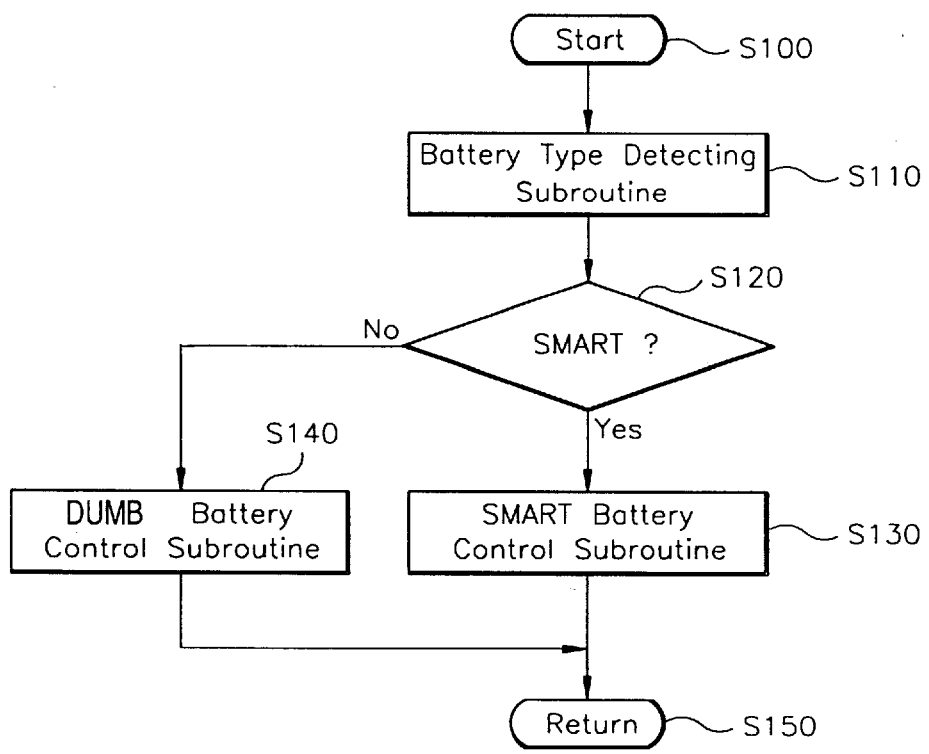
FIG. 7 is a flowchart illustrating a novel battery type detecting process performed by the microcontroller of FIG. 5.
Figure 8:
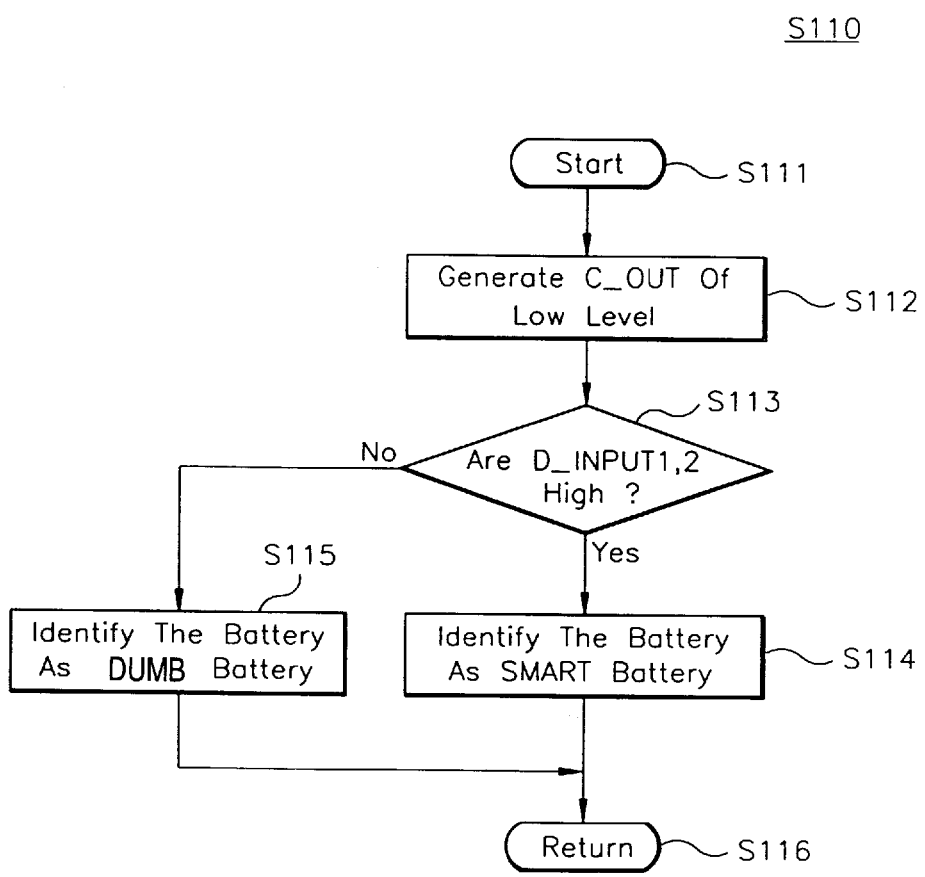
FIG. 8 is a detailed flowchart illustrating the battery type detecting subroutine of FIG. 7.

FIG. 7 illustrates a novel battery type detecting process performed by the microcontroller of FIG. 5, in accordance with this embodiment. Referring FIG. 7, at step S110, a battery type detection process is carried out. Detailed flows of this process are shown in FIG. 8. As the figure makes clear, at step S112, the signal C_OUT of a low level is generated, and the flow then advances to step S113, wherein it is determined if the signals D_INPUT1 and D_INPUT2 all are high or not. If so, at step S114, the installed battery 150 is identified as a smart battery, but if not, the installed battery 150 is identified as a dumb battery at step S115.

Figure 9:
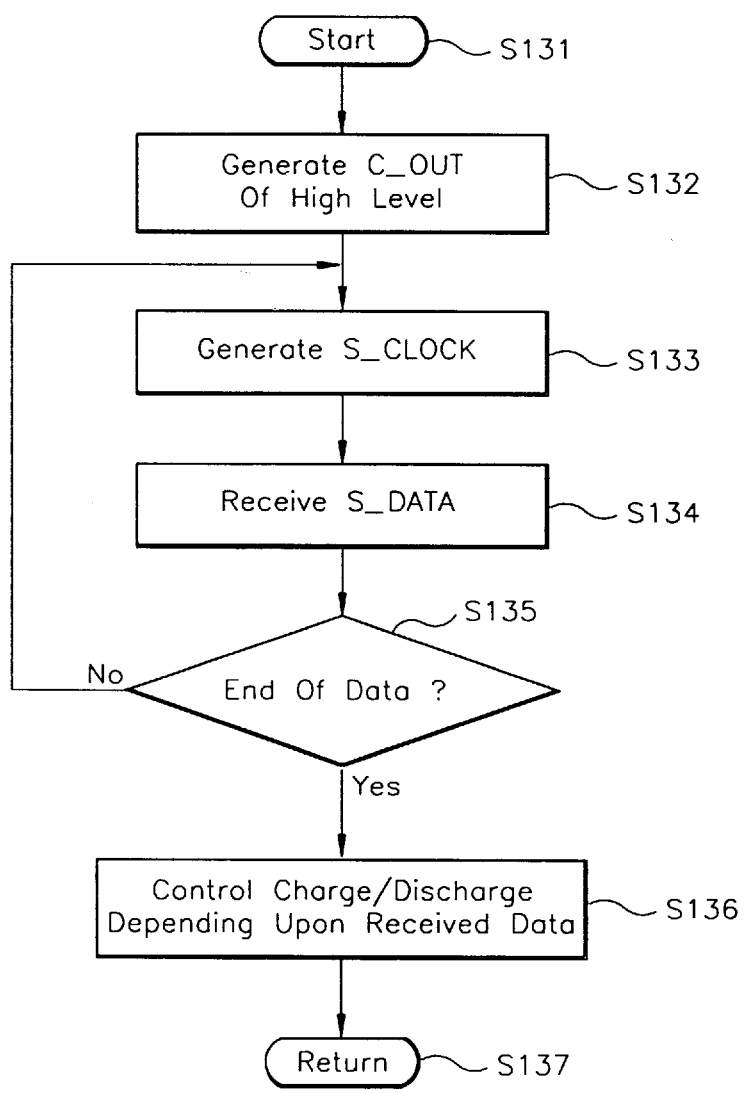
FIG. 9 is a detailed flowchart illustrating the smart battery control subroutine of FIG. 7.

Turning again to FIG. 7, once the installed battery 150 has been recognized as a smart battery, control flow proceeds to step S130 wherein a smart battery control is performed. FIG. 9 shows detailed flows of the smart battery control process. Referring to FIG. 9, at step S132, a signal C_OUT of high level is generated. The detection terminals D and C of the battery 150 are thus connected to the ports S_DATA and S_CLOCK of the microcontroller 251, respectively (see FIGS. 5 and 6). Control flow continues to step S133 wherein clock S_CLOCK is generated. Then, at step S134, the microcontroller 251 receives digital serial data S_DATA from the smart battery 150 via the switch module 252 in synchronism with the clock. The data S_DATA includes battery type (e.g., Ni—MH, Li—Ion), present charge capacity, self-discharge characteristics, charging characteristics, mode and status, a user-specified discharge rate, and a user-specified charge rate information, and so on. At step S135, it is determined whether or not the data transfer has come to an end. If so, control flow proceeds to step S136 wherein the battery charger 140 performs charge/discharge control of the battery 150 in accordance with information that depends upon the data S_DATA and is provided from the microcontroller 251, but if not, flow continues back to the step S133.

Figure 10:
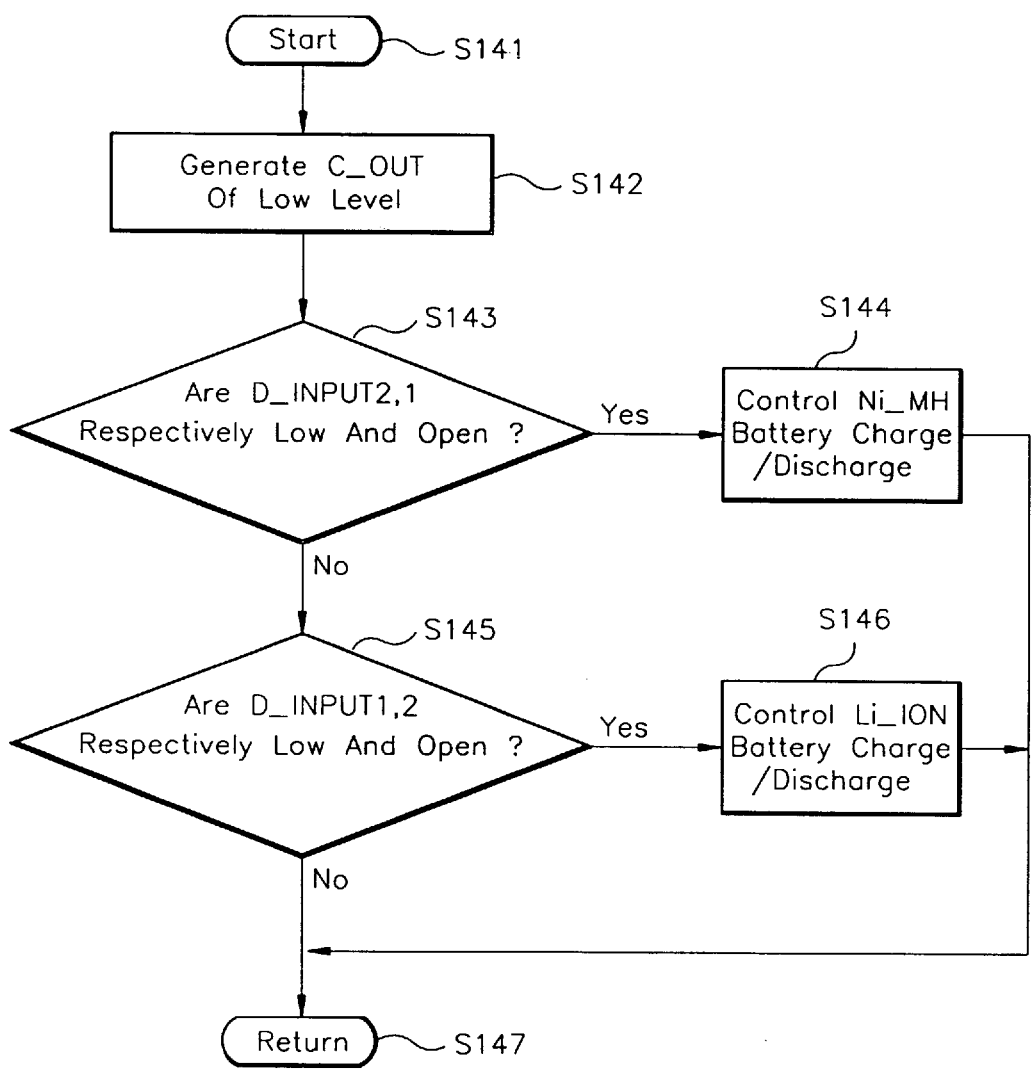
FIG. 10 is a detailed flowchart illustrating the dumb battery control subroutine of FIG. 7.

Referring back to FIG. 7, once the installed battery 150 has been recognized as a dumb battery, control flow proceeds to step S140 wherein a dumb battery control is carried out. FIG. 10 shows detailed flows of the dumb battery control process. Referring to FIG. 10, at step S142, signal C_OUT of a low level is generated so that the detection terminals D and C of the battery 150 are thus connected to the ports D_INPUT1 and D_INPUT2 of the microcontroller 251, respectively (see FIGS. 5 and 6). Thereafter, flow continues to step S143 wherein it is determined whether D_INPUT1 is open-circuited and D_INPUT2 is low. If so, flow proceeds to step S144 wherein Ni—MH dumb battery control is performed. At the step S143, if not, flow advances to step S145 wherein it is determined whether D_INPUT1 is low and D_INPUT2 is open-circuited. If so, flow proceeds to step S146 wherein Li—Ion dumb battery control is performed.

Figure 11:
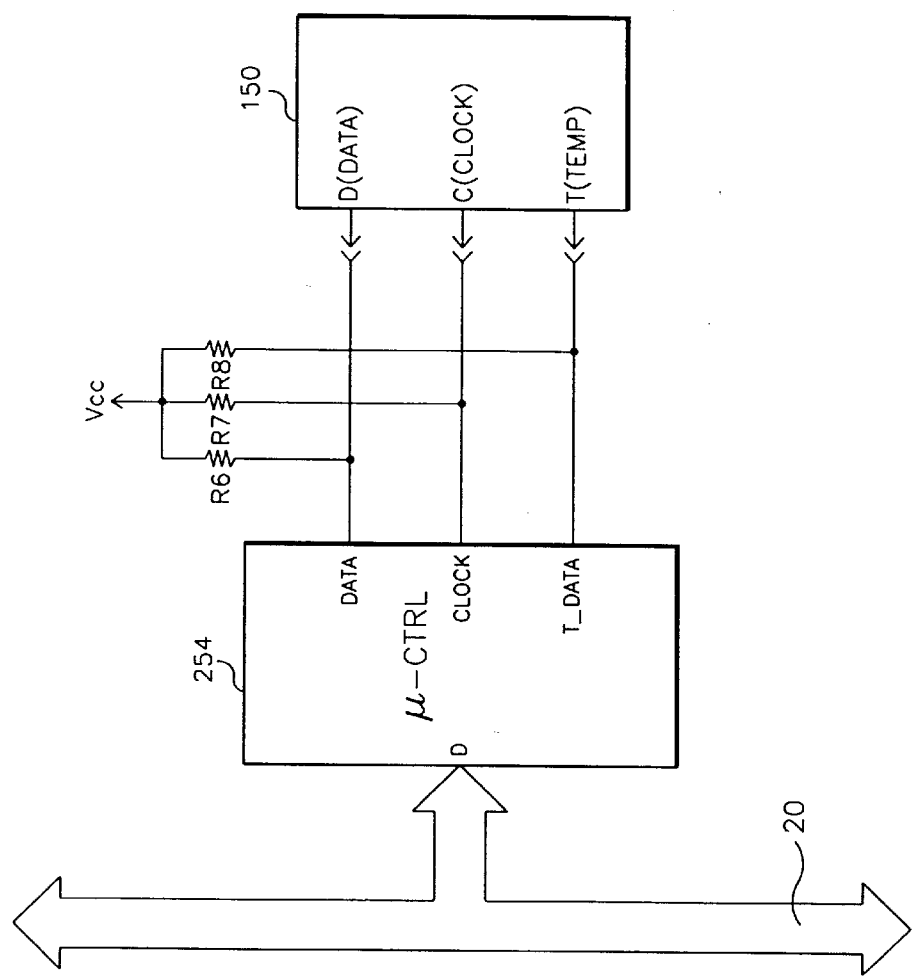
FIG. 11 is a circuit diagram of a battery type detector according to another embodiment of the present invention.

FIG. 11 is a circuit diagram of the battery type detector according to another embodiment of this invention. Referring to FIG. 11, the battery type detector 250 comprises a microcontroller 254 for detecting the type of the installed battery 150 by means of the terminal voltages on the first to third detection terminals C, D and T of the battery 150. The controller 254 has two digital ports DATA and CLOCK, and one analog port T_DATA. The ports DATA, CLOCK and T_DATA of the controller 254 are directly connected to the corresponding detection terminals D, C and T of the battery 150. The ports of the microcontroller 251 are connected to pull-up resistors R6 to R8, respectively.

The microcontroller 254 identifies the installed battery 150 as a first type of smart battery, for example, a Li—Ion smart battery when the first terminal voltage on the first detection terminal T is less than a first voltage level (e.g., 0.5 volt) and the second and third terminal voltages on the second and third detection terminals C and D all are equal to a second voltage level (e.g., 5 volts). The microcontroller 254 takes the installed battery 150 as a second type of smart battery, for example, a nickel-metal hydride (Ni—MH) smart battery when the first terminal voltage is not less than the first voltage level and the second and third terminal voltages all are equal to the second voltage level. The microcontroller 254 takes the installed battery 150 as a first type of dumb battery without the self-battery control function, for example, a Li—Ion dumb battery when the first terminal voltage is greater than the first voltage level, the second terminal voltage is equal to a third voltage level (e.g., 0 volt), and the third terminal voltage is equal to the second voltage level. The microcontroller 254 recognizes the installed battery 150 as a second type of dumb battery, for example, a Ni—MH dumb battery when the first terminal voltage is greater than the first voltage level, the second terminal voltage is equal to the second voltage level, and the third terminal voltage is equal to the third voltage level.

Figure 12:
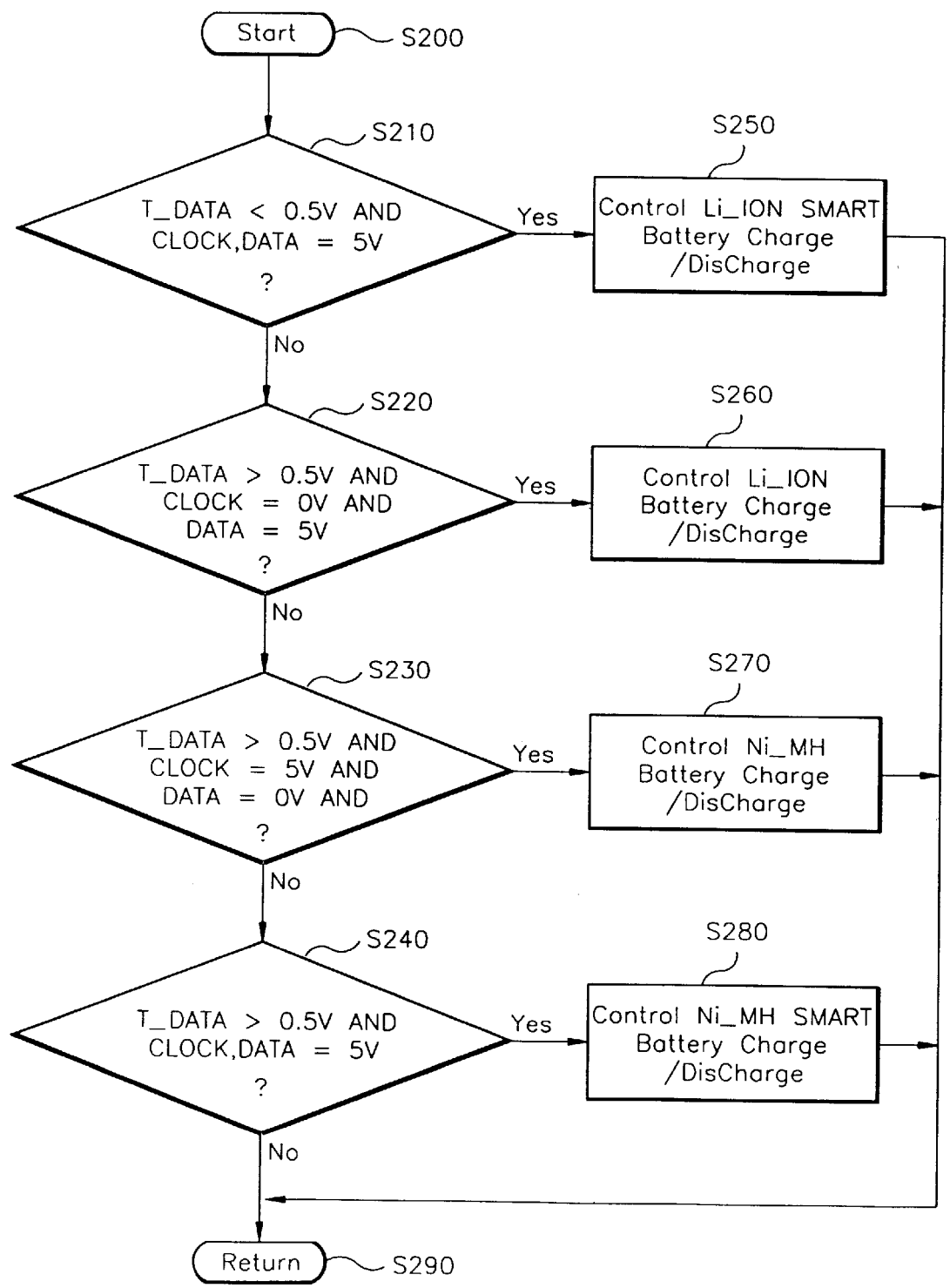
FIG. 12 is a flowchart illustrating a novel battery type detecting process performed by the microcontroller of FIG. 11.

FIG. 12 is a flowchart illustrating a novel battery type detecting process performed by the microcontroller of FIG. 11. Referring to FIG. 12, step S210 initiates a first type battery detection by determining that voltage on the detection terminal (i.e., T_DATA) is less than 0.5 volt and voltages on detection terminals (i.e., D_DATA, CLOCK) all are equal to 5 volts. If so, the microcontroller 254 recognizes the installed battery 150 as a Li—Ion smart battery. Flow advances to step S250 wherein Li—Ion smart battery control is performed. At the step S210, if not, flow continues to step S220 wherein it is determined if the first terminal voltage T_DATA is greater than 0.5 volt, the second terminal voltage CLOCK is equal to 5 volts, and the third terminal voltage DATA is equal 5 volts. If so, the microcontroller 254 identifies the installed battery 150 as a Li—Ion dumb battery without the self-battery control function. Control flow then advances to step S260 wherein Li—Ion dumb battery control is performed. At step S220, if not, flow proceeds to step S230 wherein it is determined if the terminal voltage T_DATA is greater than 0.5 volt, the second terminal voltage CLOCK is equal to 5 volts, and the third terminal voltage is equal to 0 volt. If so, the microcontroller 254 identifies the installed battery 150 as a Ni—MH dumb battery without the self-battery control function. Flow then advances to step S270 wherein Ni—MH dumb battery control is performed. At step S230, if not, flow proceeds to step S240. In this step, it is determined if the terminal voltage T_DATA is greater than 0.5 volt, the second and third terminal voltages CLOCK and DATA all are equal to 5 volts. If so, the microcontroller 254 identifies the installed battery 150 as a Ni—MH smart battery with the self-battery control function. Then, control flow continues to step S280 wherein Ni—MH smart battery control is performed.

The resistor R10 connected to the temperature terminal T of FIG. 4B has a fixed resistance value regardless of battery temperature, unlike the thermistors TM1, TM2 and TM3 of FIGS. 3A, 3B and 4A.

All the battery terminal voltages at the respective temperature terminals of Ni—MH dumb, Ni—MH smart, and Li—Ion dumb batteries are more than 0.5V within the range of tolerable battery temperatures, but the battery terminal voltage caused by the resistor R10 at the temperature terminal of the Li—Ion smart battery is less than 0.5V. As a result, the installed battery can be recognized as Li—Ion smart battery under the conditions of step S210 of FIG. 12.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. Battery-powered equipment comprising:
   a plurality of batteries each having a positive power terminal, a negative power terminal, and first to third detection terminals, wherein said batteries can be installed in the equipment;
   a battery type detector for detecting a type of an installed battery according to respective first to third terminal voltages on said first to third detection terminals of said installed battery; and
   a means for controlling charging and discharging of said installed battery on the basis of the detected battery type;
   said battery type detector comprising a microcontroller for detecting the type of said installed battery by means of the first to third terminal voltages, and an analog switch module connected between said microcontroller and said detection terminals, said analog switch module being controlled by said microcontroller;
   said first and second detection terminals corresponding to clock and data communication terminals of a smart battery with self-battery control function, respectively, and said third detection terminal corresponding to a temperature detection terminal of said installed battery;
   said microcontroller identifying said installed battery as the smart battery when the terminal voltages on said first and second detection terminals all are at predetermined voltage levels; and
   said microcontroller identifying said installed battery as a dumb battery without the self-battery control function when at least one of the terminal voltages on said first and second detection terminals is not at the predetermined voltage levels.

2. Battery-powered equipment comprising:
   a plurality of batteries each having a positive power terminal, a negative power terminal, and first to third detection terminals, wherein said batteries can be installed in the equipment;
   a battery type detector for detecting a type of an installed battery according to respective first to third terminal voltages on said first to third detection terminals of said installed battery; and
   a means for controlling charging and discharging of said installed battery on the basis ofthe detected battery type;
   said battery type detector comprising a microcontroller for detecting the type of said installed battery by means of the terminal voltages on said first to third detection terminals;
   said first and second detection terminals corresponding to clock and data communication terminals of a smart battery with self-battery control function, respectively, and said third detection terminal corresponding to a temperature detection terminal of said installed battery;
   said microcontroller identifying said installed battery as a first type of smart battery when the first terminal voltage on said first detection terminal is less than a first voltage level and the second and third terminal voltages on said second and third detection terminals all are equal to a second voltage level;
   said microcontroller identifying said installed battery as a second type of smart battery when the first terminal voltage is not less than the first voltage level and the second and third terminal voltages all are equal to the second voltage level;

said microcontroller identifying the installed battery as a first type of dumb battery without the self-battery control function when the first terminal voltage is greater than the first voltage level, the second terminal voltage is equal to a third voltage level, and the third terminal voltage is equal to the second voltage level; and said microcontroller identifying the installed battery as a second type of dumb battery when the first terminal voltage is greater than the first voltage level, the second terminal voltage is equal to the second voltage level, and the third terminal voltage is equal to the third voltage level.

3. A method of detecting a battery type of an installed battery in battery-powered equipment including a plurality of batteries each having a positive power terminal, a negative power terminal, and first to third detection terminals, wherein said batteries can be installed in the equipment, said method comprising:

detecting a type of an installed battery according to respective first to third terminal voltages on said first to third detection terminals of said installed battery; and controlling charging and discharging of said installed battery on the basis of the detected battery type;

said first and second detection terminals corresponding to clock and data communication terminals of a smart battery with self-battery control function, respectively, and said third detection terminal corresponding to a temperature detection terminal of said installed battery;

identifying said installed battery as the smart battery when the terminal voltages on said first and second detection terminals all are at predetermined voltage levels; and identifying said installed battery as a dumb battery without the self-battery control function when at least one of the terminal voltages on said first and second detection terminals is not at the predetermined voltage levels.

4. A method of detecting a battery type of an installed battery in battery-powered equipment including a plurality of batteries each having a positive power terminal, a negative power terminal, and first to third detection terminals, wherein said batteries can be installed in the equipment, said method comprising:

detecting a type of an installed battery according to respective first to third terminal voltages on said first to third detection terminals of said installed battery; and controlling charging and discharging of said installed battery on the basis of the detected battery type;

said first and second detection terminals corresponding to clock and data communication terminals of a smart battery with self-battery control function, respectively, and said third detection terminal corresponding to a temperature detection terminal of said installed battery;

identifying said installed battery as a first type of smart battery when the first terminal voltage on said first detection terminal is less than a first voltage level and the second and third terminal voltages on said second and third detection terminals all are equal to a second voltage level;

identifying said installed battery as a second type of smart battery when the first terminal voltage is not less than the first voltage level and the second and third terminal voltages all are equal to the second voltage level;

identifying the installed battery as a first type of dumb battery without the self-battery control function when the first terminal voltage is greater than the first voltage level, the second terminal voltage is equal to a third voltage level, and the third terminal voltage is equal to the second voltage level; and said microcontroller identifying the installed battery as a second type of dumb battery when the first terminal voltage is greater than the first voltage level, the second terminal voltage is equal to the second voltage level, and the third terminal voltage is equal to the third voltage level.

* * * * *